(12) United States Patent
Miyabe

(10) Patent No.: US 9,890,917 B2
(45) Date of Patent: Feb. 13, 2018

(54) HEADLIGHT OR THE LIKE HAVING URETHANE BINDER RESIN ON LENS

(71) Applicant: Noboru Miyabe, Okazaki (JP)

(72) Inventor: Noboru Miyabe, Okazaki (JP)

(*) Notice: Subject to any disclaimer, the term of this patent is extended or adjusted under 35 U.S.C. 154(b) by 241 days.

(21) Appl. No.: 14/436,860

(22) PCT Filed: Oct. 14, 2013

(86) PCT No.: PCT/JP2013/077870
§ 371 (c)(1),
(2) Date: Apr. 17, 2015

(87) PCT Pub. No.: WO2014/061620
PCT Pub. Date: Apr. 24, 2014

(65) Prior Publication Data
US 2015/0292700 A1    Oct. 15, 2015

(30) Foreign Application Priority Data

Oct. 18, 2012  (JP) .................................. 2012-006339
Oct. 23, 2012  (JP) .................................. 2012-006437

(51) Int. Cl.
*F21S 8/10*     (2006.01)
*C08J 7/14*     (2006.01)
(Continued)

(52) U.S. Cl.
CPC ........... *F21S 48/1225* (2013.01); *C08J 7/047* (2013.01); *C09D 5/00* (2013.01); *C09D 7/1233* (2013.01);
(Continued)

(58) Field of Classification Search
CPC .... C08J 2369/00; C08J 2475/04; C08J 7/047; C08K 5/101; C09D 175/04; C09D 5/00;
(Continued)

(56) References Cited

U.S. PATENT DOCUMENTS

2009/0087551 A1* 4/2009 Parsons .................. B05D 5/005
                                                              427/140
2013/0288042 A1* 10/2013 Haines .................. C09D 5/004
                                                              428/334

FOREIGN PATENT DOCUMENTS

JP   H03123677 A    5/1991
JP   H10269801 A   10/1998
(Continued)

OTHER PUBLICATIONS

ISA Japanese Patent Office, International Search Report of PCT/JP2013/077870, WIPO, dated Dec. 24, 2013, 4 pages.

*Primary Examiner* — Thao T Tran
(74) *Attorney, Agent, or Firm* — Alleman Hall Creasman & Tuttle LLP

(57) ABSTRACT

A refurbished headlight or the like, with restored translucency, transparency, and luster and high durability, is provided as the aged headlight or the like of polycarbonate resin. Furthermore, a new headlight or the like, with a polycarbonate resin lens which is not degraded by aging over a long period of time, is provided. A headlamp, on which a membrane of clear urethane binder resin is provided after a surface layer of reinforced plastic or the like remaining on a lens surface and degraded parts of a lens body are removed by grinding, is provided. When a yellow tinge remains on the lens body, the headlamp, on which the membrane of urethane binder resin is provided by applying a purple-black mixed urethane coating mixed with a purple-black mixing pigment, is provided. Moreover, a new headlamp that has a membrane of clear urethane binder resin on a lens surface is provided.

3 Claims, 1 Drawing Sheet

(51) Int. Cl.
  *C09D 5/00* (2006.01)
  *C09D 7/12* (2006.01)
  *C09D 175/04* (2006.01)
  *C08J 7/04* (2006.01)
  *F21V 3/04* (2006.01)
  *C08K 5/101* (2006.01)

(52) U.S. Cl.
  CPC .......... *C09D 175/04* (2013.01); *F21S 48/12* (2013.01); *F21S 48/1233* (2013.01); *F21S 48/2212* (2013.01); *F21V 3/0436* (2013.01); *F21V 3/0472* (2013.01); *C08J 2369/00* (2013.01); *C08J 2475/04* (2013.01); *C08K 5/101* (2013.01)

(58) Field of Classification Search
  CPC .... C09D 7/1233; F21S 48/12; F21S 48/1225; F21S 48/1233; F21S 48/2212; F21V 3/0436; F21V 3/0472
  USPC .............................................. 428/423.1, 412
  See application file for complete search history.

(56) References Cited

FOREIGN PATENT DOCUMENTS

| | | | |
|---|---|---|---|
| JP | H11345503 A | 12/1999 | |
| JP | 2000222912 A | 8/2000 | |
| JP | 2002050215 A | 2/2002 | |
| JP | 2004137471 A | 5/2004 | |
| KR | 0623659 B1 * | 9/2006 | ........... C09D 175/04 |

* cited by examiner

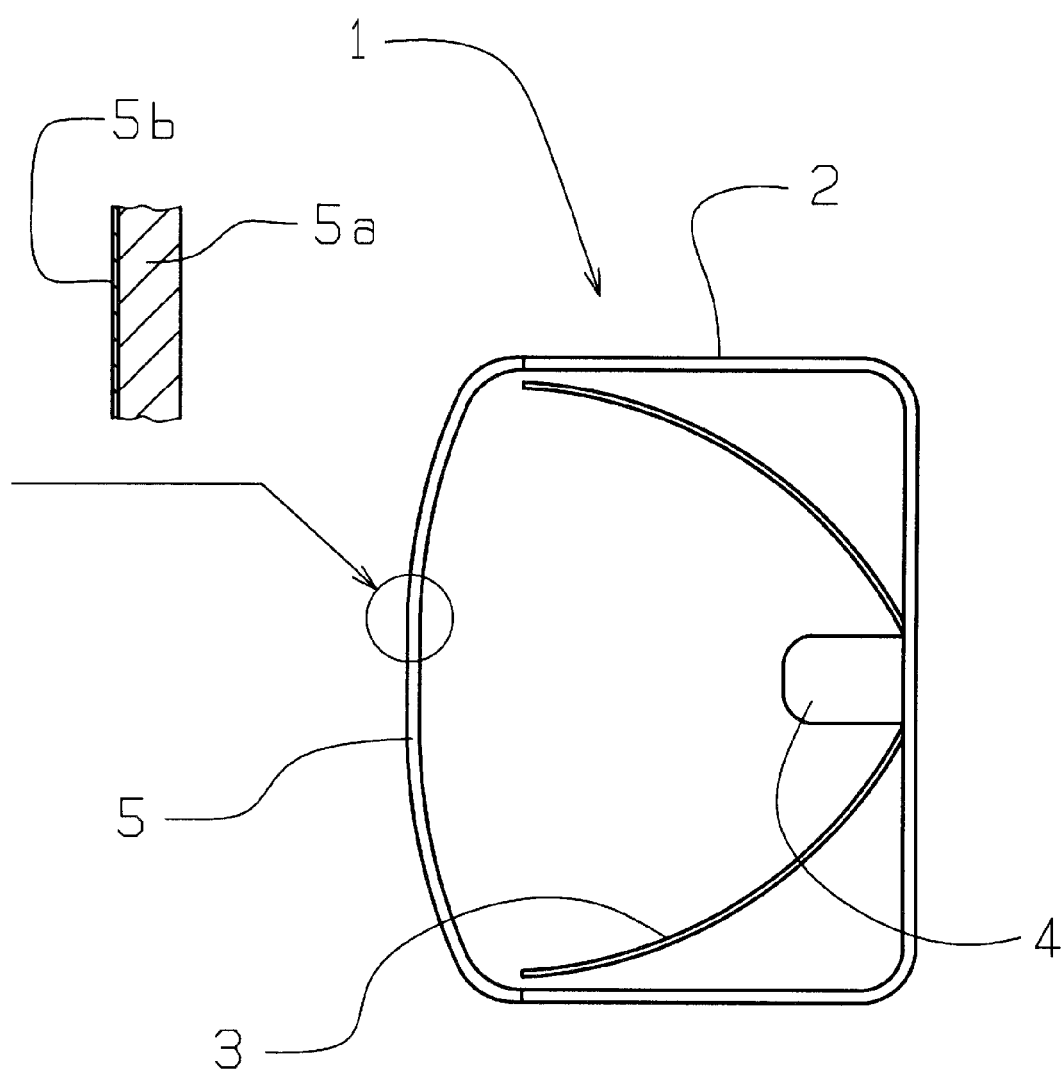

HEADLIGHT OR THE LIKE HAVING URETHANE BINDER RESIN ON LENS

FIELD OF THE INVENTION

The present invention relates to a technique for restoring translucency, transparency, and luster to lenses of headlamps, side marker lamps, tail lamps, brake lights, direction indicator lamps, fog lamps, or backup lights (hereinafter collectively referred to as "a headlight or the like") which have been degraded by aging or taken on yellow tinges (hereinafter simply referred to as "yellowing"). The present invention also relates to a headlight or the like with lenses which do not age over a long period of time.

BACKGROUND ART

Various kinds of headlights and the like are used for automobiles, and a polycarbonate resin, which is lightweight, unbreakable, and has excellent translucency, is used as a material for a lens body that is a surface for transmitting light emitted by an illuminant. Since the polycarbonate resin is degraded or turned yellow by ultraviolet rays, in the case of new vehicles, a surface layer of reinforced plastic or a surface layer of a resin containing an ultraviolet ray absorbent (hereinafter simply referred to as "a surface layer of reinforced plastic or the like") is provided to prevent the lens body from degrading or yellowing (see, for example, Patent Document 1).

However, after multiple years of use, automobiles have a problem of age deterioration wherein the surface layer of reinforced plastic or the like is partially exfoliated and the surface of the lens body ages and turns yellow because the surface of the bare lens body is exposed to ultraviolet rays or acid rain or hit by flying gravel flipped up by wheels. In addition, since the surface of the lens body of the headlights or the like which was degraded and turned yellow, lacks translucency, transparency, and luster, decreasing brightness of the headlight or the like and impairing of an aesthetic appearance have been problems.

RELATED ART

Patent Document

Patent Document 1: Japanese Unexamined Patent Application Publication No. 2000-222912

SUMMARY OF THE INVENTION

Problems to be Solved by the Invention

A refurbished headlight or the like with restored translucency, transparency, and luster and high durability is provided as a headlight or the like, in which a lens of polycarbonate resin was degraded by aging, a surface layer of reinforced plastic or the like provided on the lens surface was partially exfoliated, or a surface of the lens body was degraded by aging and turned yellow. In addition, the headlight or the like with the polycarbonate resin lens which will not be degraded by aging over a long period of time is provided as the headlight or the like that is new and has not been degraded by aging.

BRIEF SUMMARY OF THE INVENTION

While a sound surface is exposed by removing a surface layer of reinforced plastic or the like remaining on a lens surface and degraded parts of a lens body of an aged headlight or the like by grinding, fine irregularities are generated on the surface, and a membrane of urethane binder resin is provided on the lens surface by applying a clear urethane coating in which a hardening agent is mixed with a base resin.

In addition, in a case when a yellow tinge remains on ae lens body from which the degraded parts have been removed, a membrane of the urethane binder resin is provided by applying a purple-black mixed urethane coating that consists of either one of mixed purple and black pigments or mixed red, blue, and black pigments (hereinafter simply referred to as "a purple-black mixed pigment") mixed with a clear urethane coating at a ratio of no more than 1% by weight.

Moreover, a new or not-aged headlight or the like, which was provided with a membrane of the urethane binder resin on the lens surface by generating fine irregularities on the surface and also applying a clear urethane coating in which a hardening agent is mixed with a base resin, is provided.

Effects of the Invention

Since the membrane of the urethane binder resin has high durability, and excellent translucency, transparency, and luster, a headlight or the like that withstands a long time of use, irradiates strong light, and has a good appearance was provided.

In addition, in the case when a yellow tinge remains on the lens body, the refurbished headlight or the like with a good appearance, which has removed the yellow tinge by complementary color effects by applying the purple-black mixed urethane coating, was provided.

Moreover, the refurbished headlight or the like was provided without the problems of decreasing brightness and impairing an aesthetic appearance, which an aged headlight or the like has due to use.

BRIEF DESCRIPTION OF THE DRAWINGS

FIG. 1 is a sectional view of a headlamp including an enlarged partial view of a lens.

DETAILED DESCRIPTION OF THE EMBODIMENTS

A polycarbonate resin may be used as a material of a lens body which is the surface where light emitted by an illuminant is transmitted, and under a condition that a headlight or the like, which has a surface layer of reinforced plastic on the lens surface in a new condition, has been used for multiple years, the surface layer of reinforced plastic or the like and the degraded parts of the lens body are removed by grinding, so that the sound surface of the lens surface is exposed, and then by applying a clear urethane coating in which a hardening agent is mixed with a base resin, a membrane of urethane binder resin is provided on the lens surface.

In general, the lens body of a headlight or the like that has been used for 3 to 5 years is degraded by aging. Although a method for grinding the surface layer of reinforced plastic or the like remaining on the lens surface and the degraded parts of the lens body is not specifically limited, they are easily removed by using sandpaper and fine irregularities are generated on the surface.

Moreover, since most of the degraded parts or the yellow tinges are generated within 0.2 mm from the surface, removing areas no more than 0.2 mm from the surface is preferred. Furthermore, the thickness of the urethane binder resin membrane is preferred in a range from 0.1 to 0.6 mm because the membrane of the urethane binder resin that is thin or too thick is easily broken.

Moreover, when the yellow tinge remains on the lens body from which the degraded parts have been removed, the membrane of urethane binder resin is provided by applying purple-black mixed urethane coating that is made by mixing purple-black mixing pigment into clear urethane coating. By mixing the purple-black mixing pigment, an effect of removing the yellow tinge of the polycarbonate resin is obtained by complementary color effects. Since mixing red and blue makes purple, either of mixed purple and black pigments or mixed red, blue, and black pigments may be used.

Accordingly, when the yellow tinge does not remain on the lens body from which the degraded parts have been removed, mixing the purple-black mixing pigment is not necessary and furthermore, it is preferable to mix by suitably changing the amount of purple-black mixing pigments according to degree of the yellow tinge. As a result of trial and error, it was preferable to suitably choose the ratio of the purple-black mixing pigment to the clear urethane coating at a range from 0 to 1% by weight.

Moreover, the headlight or the like, which is provided with the membrane of urethane binder resin on the lens surface by applying the clear urethane coating in which a hardening agent is mixed with a base resin, is provided for a new or not aged headlight or the like that uses the lens body of polycarbonate resin since the headlight or the like, which has high durability, and is excellent in translucency, transparency, and luster, can be obtained.

While fine irregularities are generated and an adhesive area between the lens surface and the membrane of urethane binder resin is increased by grinding the lens surface with sandpaper, an anchor effect, which is when the urethane binder resin goes into the fine irregularities and is hardened, can be obtained, and thus grinding the lens surface with the sandpaper is preferred since a membrane of the urethane binder resin having a higher adhesiveness can be provided.

Moreover, the urethane coating is the one in which a hardening agent that consists of ethyl acetate and butyl acetate is mixed with a base resin that consists of isobutyl acetate and butyl acetate. For example, a coating in which RETAN PG ECO RR Clear as a hardening agent is mixed into RETAN PG ECO RR Clear 210 Base of Kansai Paint Co., Ltd. as a base resin, at a ratio of 2 to 1 of the base resin to the hardening agent by weight, may be used.

Moreover, the urethane coating is the one in which a hardening agent that consists of methyl isobutyl ketone, isobutyl acetate, and n-Butyl acetate is mixed to the base resin that consists of n-Butyl acetate, methyl isobutyl ketone, acetone, and methyl ethyl ketone. For example, the coating which has Multi Eco 20 LX Clear of Nippon Paint Co., Ltd. as the base resin mixed with Ultra 20 Hardener as the hardening agent at a ratio of 3 to 1 of the base resin to the hardening agent by weight may be used.

Furthermore, the urethane coating is the one in which the hardening agent that consists of ethyl acetate is mixed with the base resin that consists of methyl isobutyl ketone, isobutyl acetate, and butyl acetate. For example, the coating which has RETAN PG ECO HX (Q) Base of Kansai Paint Co., Ltd. as the base resin mixed with Clear HX Standard as the hardening agent at a ratio of 2 to 1 of the base resin to the hardening agent by weight may be used.

DESCRIPTION OF EMBODIMENTS

First Embodiment

Hereinafter a first embodiment of the present invention will be described by example in FIG. 1. According to the first embodiment, a headlamp 1 is provided with an illuminant 4 and a reflector 3 in a housing 2, and is also furnished with a lens 5. The headlamp 1 has a structure that reflects light emitted by the illuminant 4 toward the front by the reflector 3, passes the light through the lens 5, and illuminates a front of the vehicle.

When a vehicle was new, the lens 5 was provided with a surface layer of reinforced plastic on a surface of a lens body 5a of polycarbonate resin. However after the vehicle was used for 3 to 5 years, the surface layer of reinforced plastic was partially exfoliated and the surface of the exposed lens body 5a was degraded and turned yellow by aging.

Accordingly, the surface layer of the reinforced plastic remaining on the surface of the lens 5, and degraded parts of the lens body 5a, were removed by grinding with sandpaper. In the present embodiment, about 0.1 mm was removed from the surface of the lens body 5a. Accordingly, the sound surface of the lens body 5a without the degraded parts was obtained, but a slight yellow tinge remained on the lens body 5a.

Moreover, a purple-black mixed urethane coating, which consists of mixing a purple-black mixing pigment at 0.5% by weight with a clear urethane coating formed by mixing a hardening agent, which consists of ethyl acetate and butyl acetate, with a base resin, which consists of isobutyl acetate and butyl acetate, is applied on the surface of the sound lens body 5a after grinding.

As the clear urethane coating, the coating in which RETAN PG ECO RR Clear is the hardening agent mixed with RETAN PG ECO RR Clear 210 Base of Kansai Paint Co., Ltd. as the base resin at a ratio of 2 to 1 of the base resin to the hardening agent by weight, may be used.

A membrane 5b of urethane binder resin, which has a thickness from 0.2 to 0.3 mm, is formed on the surface of the lens body 5a, on which the purple-black mixed urethane coating was applied, and the yellow tinge of the lens body 5a was negated by complementary color effects due to mixing the purple-black mixing pigment. Therefore, the headlamp 1 was refurbished to have the lens 5 with excellent translucency, transparency, and luster. Since the urethane binder resin has excellent durability, this condition may be maintained for about 10 years.

Second Embodiment

A headlamp in a second embodiment differs from the headlamp 1 in the first embodiment in that it is a new headlamp without the surface layer of reinforced plastic and in its use of a clear urethane coating that does not mix the purple-black mixing pigment. The process of removing the degraded parts of the lens body by grinding is not necessary, but the lens surface was grinded with sandpaper is preferred since an anchoring effect can be obtained.

On the other hand, it is the same as the headlamp 1 in the first embodiment in the application of the urethane coating to the surface of the lens body. In order to prevent redundant descriptions, even though the matters explained in the first embodiment are not described, the headlamp having excellent translucency, transparency, and luster, and high durability is provided.

INDUSTRIAL APPLICABILITY

The present invention is used not only by the industries that manufacture and distribute headlights and the like, but also by industries that provide inspection and repair services for automobiles or automobile parts.

EXPLANATION OF REFERENCE CHARACTERS

1 Headlamp
2 Housing
3 Reflector
4 Illuminant
5 Lens
5a Lens body
5b Membrane

I claim:

1. A refurbished lamp which is a headlamp, a side marker lamp, a tail lamp, a brake light, a direction indicator lamp, a fog lamp, or a backup light, prepared by a process comprising:
   providing a lamp including a lens body of polycarbonate resin, including, on a lens surface, either a surface layer of reinforced plastic or a surface layer of a resin containing an ultraviolet ray absorbent;
   removing the surface layer by grinding to expose a sound surface of the lens body, so as to generate fine irregularities on the lens surface; and
   providing a membrane of urethane binder resin on the lens surface, wherein the membrane of urethane binder resin comprises a clear urethane coating comprising a mixture of a hardening agent and a base resin, wherein a thickness of the membrane is in a range from 0.1 to 0.6 millimeters, and wherein the clear urethane coating is:
      a coating in which a hardening agent which consists of an ethyl acetate and butyl acetate is mixed with a base resin which consists of isobutyl acetate and butyl acetate; or
      a coating in which a hardening agent which consists of methyl isobutyl ketone, isobutyl acetate, and n-Butyl acetate is mixed with a base resin which consists of n-Butyl acetate, methyl isobutyl ketone, acetone, and methyl ethyl ketone; or
      a coating in which a hardening agent of ethyl acetate is mixed with a base resin which consists of methyl isobutyl ketone, isobutyl acetate, and butyl acetate.

2. A refurbished lamp which is a headlamp, a side marker lamp, a tail lamp, a brake light, a direction indicator lamp, a fog lamp, or a backup light, prepared by a process comprising:
   providing a lamp including a lens body of polycarbonate resin, including, on a lens surface, either a surface layer of reinforced plastic or a surface layer of a resin containing an ultraviolet ray absorbent;
   removing the surface layer by grinding to expose a sound surface of the lens body, so as to generate fine irregularities on the lens surface; and
   providing a membrane of urethane binder resin on the lens surface, wherein the membrane of urethane binder resin comprises a clear urethane coating comprising a mixture of a hardening agent and a base resin, and wherein a thickness of the membrane is in a range from 0.1 to 0.6 millimeters,
   wherein the membrane of urethane binder resin is provided by applying a purple-black mixed urethane coating that consists of mixing either one of mixed purple and black pigments or mixed red, blue, and black pigments, a ratio of the purple-black mixed urethane coating to the clear urethane coating being no more than 1% by weight, and wherein the clear urethane coating is:
      a coating in which a hardening agent which consists of an ethyl acetate and butyl acetate is mixed with a base resin which consists of isobutyl acetate and butyl acetate; or
      a coating in which a hardening agent which consists of methyl isobutyl ketone, isobutyl acetate, and n-Butyl acetate is mixed with a base resin which consists of n-Butyl acetate, methyl isobutyl ketone, acetone, and methyl ethyl ketone; or
      a coating in which a hardening agent of ethyl acetate is mixed with a base resin which consists of methyl isobutyl ketone, isobutyl acetate, and butyl acetate.

3. A lamp which is a headlamp, a side marker lamp, a tail lamp, a brake light, a direction indicator lamp, a fog lamp, or a backup light, comprising:
   a lamp having a lens body of polycarbonate resin with fine irregularities on a lens surface of the lens body, and a membrane of urethane binder resin on the lens surface, wherein the membrane is formed from a clear urethane coating comprising a mixture of a hardening agent and a base resin, wherein a thickness of the membrane is in a range from 0.1 to 0.6 millimeters, and wherein the clear urethane coating is:
      a coating in which a hardening agent which consists of an ethyl acetate and butyl acetate is mixed with a base resin which consists of isobutyl acetate and butyl acetate; or
      a coating in which a hardening agent which consists of methyl isobutyl ketone, isobutyl acetate, and n-Butyl acetate is mixed with a base resin which consists of n-Butyl acetate, methyl isobutyl ketone, acetone, and methyl ethyl ketone; or
      a coating in which a hardening agent of ethyl acetate is mixed with a base resin which consists of methyl isobutyl ketone, isobutyl acetate, and butyl acetate.

* * * * *